United States Patent
Borgudd

[11] Patent Number: 5,176,589
[45] Date of Patent: Jan. 5, 1993

[54] DIFFERENTIAL GEAR

[76] Inventor: Slim Borgudd, Flat 10. Wootton Hall, Wootton Wawen, Solihull, Westshire BE95 6EE, United Kingdom

[21] Appl. No.: 150,416
[22] PCT Filed: May 29, 1987
[86] PCT No.: PCT/SE87/00266
 § 371 Date: Apr. 22, 1991
 § 102(e) Date: Apr. 22, 1991
[87] PCT Pub. No.: WO87/07348
 PCT Pub. Date: Dec. 3, 1987

[51] Int. Cl.⁵ .......................... F16H 1/38; F16H 1/44
[52] U.S. Cl. .................................... 475/221; 475/231
[58] Field of Search ............. 74/677, 688, 710, 710.5, 74/711, 714; 180/249, 250; 475/36, 43, 47, 53, 72, 84, 86, 87, 88, 221, 225, 231, 237, 238, 239, 243, 244, 245, 249, 250

[56] References Cited

U.S. PATENT DOCUMENTS

| 2,884,808 | 5/1959 | Mueller | 74/710.5 X |
| 3,446,092 | 5/1969 | Moan | 74/705 X |
| 3,722,300 | 3/1973 | Crooks | 74/705 X |
| 3,722,301 | 3/1973 | Crooks | 74/705 X |
| 3,915,033 | 10/1975 | Polak | 74/705 X |
| 4,207,780 | 6/1980 | Saxton | 74/710.5 |

FOREIGN PATENT DOCUMENTS

| 0771446 | 10/1934 | France | 74/705 |
| 0952861 | 3/1964 | United Kingdom | 74/710.5 |

Primary Examiner—Leslie A. Braun
Assistant Examiner—Harold F. Macris
Attorney, Agent, or Firm—Pollock, Vande Sande & Priddy

[57] ABSTRACT

A differential gear has a housing which is rotatably driven and which contains the shafts of differential planet wheels for rotation with the housing. The planet wheels are freely rotatable per se and are associated with meshing side wheels rotatably journalled relative to the housing and rotatably connected with a respective shaft which is rotatable relative to the housing.

12 Claims, 5 Drawing Sheets

DIFFERENTIAL GEAR

FIELD OF THE INVENTION

The present invention concerns a differential gear having a differential gear housing driveable for rotation, the shafts of differential planet wheels being arranged in said housing for rotation therewith, the planet wheels being freely rotatable per se and having side wheels meshing therewith, said side wheels being freely rotatably journalled relative to the differential gear housing and being in rotational connection with a respective shaft rotatable relative to the differential gear housing.

BACKGROUND OF THE INVENTION

Such a differential gear is commonly used in motor vehicles to distribute the drive power from the drive engine to two driving wheels. The differential gear housing carries a crown wheel meshing with a differential drive pinion which in turn is driven by the motor. The side wheels are directly connected to a respective output shaft carrying a driving wheel. Known differential gears have the serious drawback that they function as intended only when the driving wheels are in full frictional engagement with the ground. As soon as a driving wheel looses its full engagement, the driving capacity of the other driving wheel is correspondingly decreased so as to entirely cease when the first driving wheel has lost all frictional contact with the ground. This peculiarity of conventional differential gears involves great risks in skid situations, particularly in connection with the so called secondary skid. A secondary skid occurs after a primary skid when both driving wheels, according to the above, have lost their driving capacity. During the primary skid the driving wheel leading in the direction of skidding has at least some engagement in the direction of traction, while the other driving wheel is more or less raised from the ground. The differential gear then transfers substantially all drive power to the easiest driveable driving wheel, i.e., the raised one, in which is built up a large mass energy.

When the primary skid ceases, this driving wheel regains its contact with the ground, whereupon the stored energy is instantaneously transferred to the ground, resulting in a violent thrown in the opposite direction. Unlike the primary skid, which is built up relatively slowly, the secondary skid occurs considerably faster and often has serious consequences.

It is apparent from the above presentation that there is a need to be able to control the power distribution to the output shafts of a differential gear. A known extremity in this respect is the differential lock that blocks the distributing function of the differential gear such that the output shafts are rigidly interconnected. The advantages and disadvantages of such lock herewith are well known. Further, so called anti-spin systems are known which lower the drive power until wheel spin ceases, but which cannot direct the drive power to a selective driving wheel.

SUMMARY OF THE INVENTION

The object of the present invention, thus, is to provide a differential gear which makes it possible to completely freely distribute input power between the two output shafts of the gear, i.e., to choose everything from a pure differential lock function to a function where the shafts rotate oppositely.

The differential gear of the present invention, thus, is basically a conventional differential gear which is completed with at least one planetary gear. More precisely, it is a differential gear, at least one output wheel (side wheel) of which carries the planet wheel holders of a planetary gear, the sun wheel of which is freely rotatably journalled relative to the shaft of the side wheel, and the ring wheel of which is rigidly connected to the differential gear housing.

In a first, preferred embodiment of the invention, the differential gear can be so arranged that the sun wheel is connected to a control shaft in the shape of a hollow shaft which is journalled on the shaft of the side wheel, which, in this case, is one output shaft of the gear. Control of the gear is accomplished in that the control shaft and therewith the sun wheel is imparted a rotational speed differing from that of the output shaft, or, the differential gear housing. This can be done in that the control shaft is separately driveable (active control), or, brakeable (passive control) relative to the differential gear housing, or, the output shaft.

In a second embodiment, the differential gear according to the invention can be arranged such that the sun wheel is connected to an output shaft, while the shaft of the side wheel is a control shaft in the shape of a hollow shaft journalled around the output shaft. Control is achieved in that the control shaft, and with it the planet wheel holder and the side wheel is given a rotational speed differing from that of the output shaft (active or passive control as above).

Control of the gear by actuating the control shaft in both embodiments results in a rotational speed difference between the output shafts. Unactuated it operates like an entirely ordinary differential gear.

BRIEF DESCRIPTION OF THE DRAWINGS

The invention will now be described with reference to the accompanying drawings, wherein several embodiments of the invention are shown for purposes of illustration, and wherein.

DESCRIPTION OF THE PREFERRED EMBODIMENTS

Figure 1:
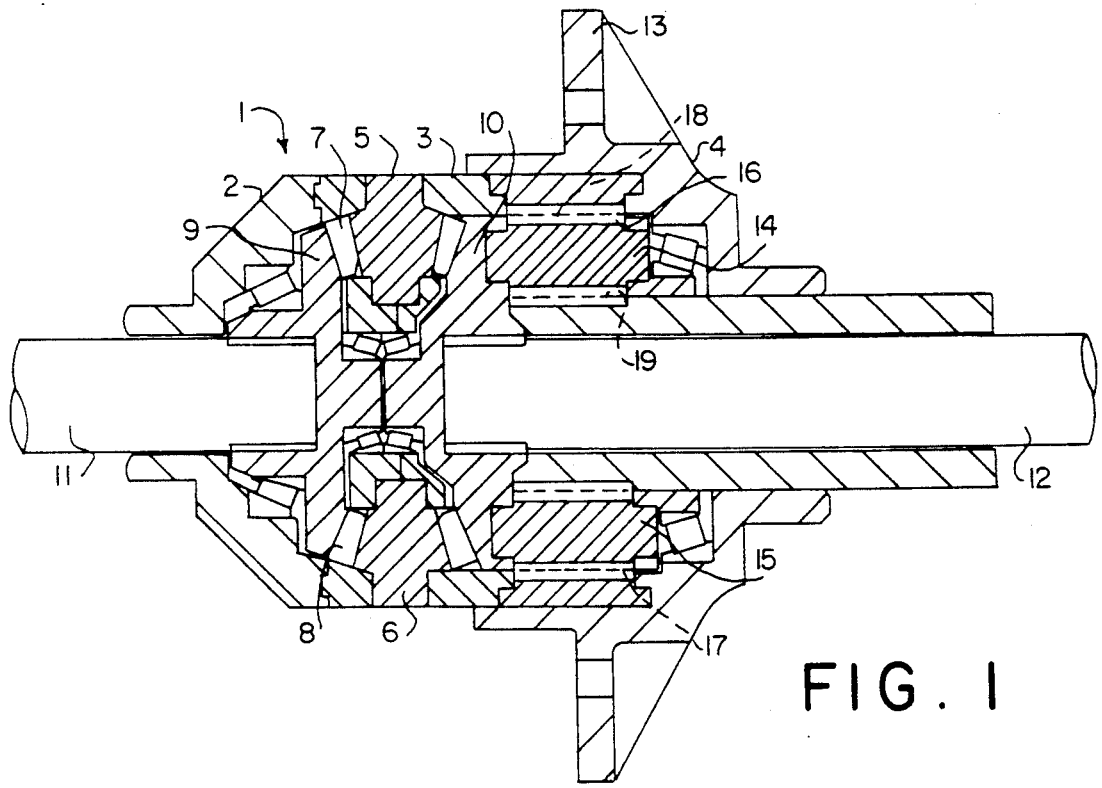
FIG. 1 shows an axial section through a gear made according to the preferred embodiment.

The differential gear housing 2 shown FIG. 1, includes several assembled components 2, 3 and 4, is provided with a plurality of radial shafts, two of which shafts 5 and 6 are shown. These shafts freely rotatably carry planetary wheels 7 and 8, respectively, of the differential gear, which mesh with side wheels 9 and 10, respectively, of the gear. The side wheels 9 and 10 are freely rotatable relative to the housing 1 and by means of splines non-rotationally connected to a respective output shaft 11 and 12 extending out of the housing 1 and being rotatable relative thereto. Component 4 of the housing 1 is provided with flanges 13 for mounting a crown wheel (not shown) by the housing 1 is driveable in rotation. The differential gear now described is a conventional differential gear the gear-wheels of which are permanently in mesh with each other.

Instead of the differential gear described above having differential planetary wheels with radial axes, the invention applies equally well to any other kind of differential gear, e.g. gear having differential planetary wheels with axial axes.

According to the invention, at least one of the side wheels of the gear is adapted as a holder for the planet wheels of a planetary gear. In the example shown in FIG. 1, the side wheel 10 is planet wheel holder for a plurality of planet wheels, of which are shown two planet wheels 16 and 17 freely rotatable about shafts 14 and 15. Further, according to the invention, the differential gear housing is connected to the ring wheel of the planetary gear. In the example shown in FIG. 1 a ring wheel 18 is pressed into component 4 of the housing 1 and is rotatable with the housing. Finally, according to the invention, the sun wheel of the planetary gear is rotatable relative to the shaft connected to the side wheel in question. In the example according to FIG. 1 the sun wheel 19 of the planetary gear is arranged in the end of a hollow shaft 20 which is rotatable about the output shaft 12 connected to the side wheel 10. The planet wheels 16 and 17, which are freely rotatable relative to the side wheel 10, mesh with the ring wheel 18 and the sun wheel 19.

When the housing 1 is drivingly rotated and the shafts 11 and 12 rotate at equal speeds (e.g., driving straight ahead in a motor vehicle application), the differential planet wheels 7 and 8 rotating with the housing 1 drive the two side wheels 9 and 10 at equal rotational speeds. The planetary gear, which, according with the invention, is associated to the differential gear, has no effect herein, since the ring wheel 18 rotates with the speed of the housing 1 at the same time as the shafts 14 and 15 of the planet wheels 16 and 17, respectively, rotate with the side wheel 10. Thus, there is no rotation of the planet wheels 16 and 17 per se, but the hollow shaft 20 rotates with the speed of the output shaft 12 and the gear functions like an ordinary differential gear. The relative rotation occuring at rotational speed difference between the shafts 11 and 12 (driving in curve) results in rotation not only of the planet wheels 7 and 8 about their shafts 5 and 6, but also of the planet wheels 16 and 17, which brings about rotation of the hollow shaft 20 relative to the shaft 12. Since the hollow shaft 20 is allowed to rotate freely, the gear still functions like a conventional differential gear.

Figure 2:
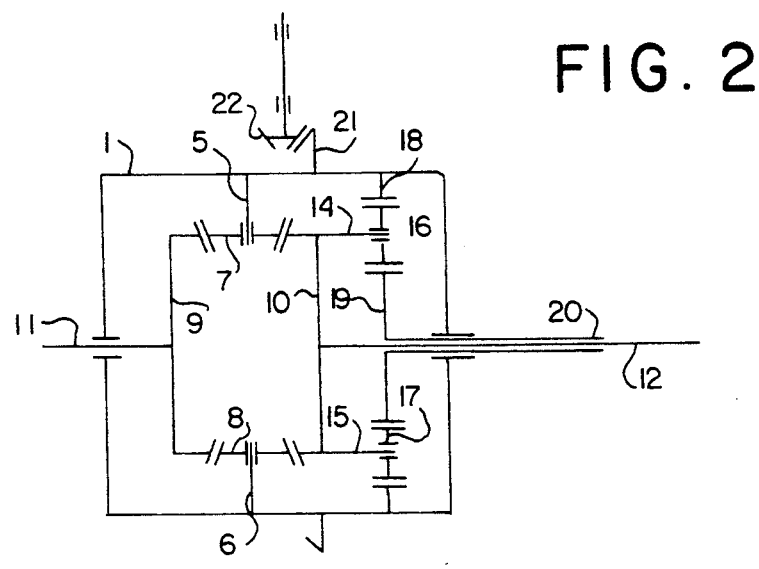
FIG. 2 shows schematically the same gear.

The principal structure of the differential gear FIG. 1 is shown schematically in FIG. 2.

By means of the invention, it is possible to control the rotation of the hollow shaft 20 acting as control shaft, and thereby to control the differential gear. This can take place actively in that the control shaft is driven, or passively in that it is braked.

These possibilities will now be discussed with reference to schematic FIGS. 3 to 5 which further show a crown wheel 21 connected to the housing 1 and a pinion 22 driving the crown wheel.

Figure 3:
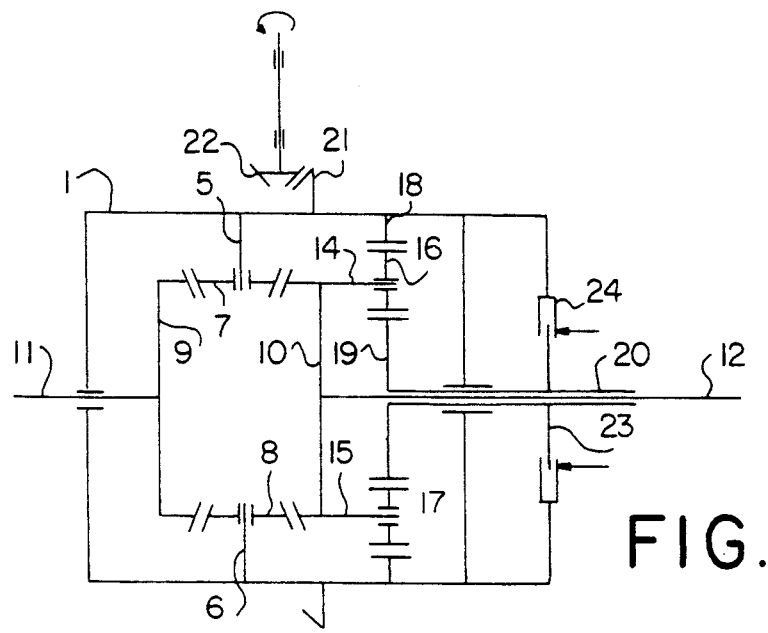
FIG. 3 shows in the same manner the same gear adapted for passive control.

Passive control of the gear is shown in FIG. 3. For this purpose, a braking disk 23 is arranged on the control shaft 20, and a brake 24 cooperating therewith is connected to the gear housing 1. The brake 24 can be so arranged that it can cause anything from slip braking of the brake disk 23 to complete retention thereof, i.e., it can act as differential brake and as differential lock.

Figure 4:
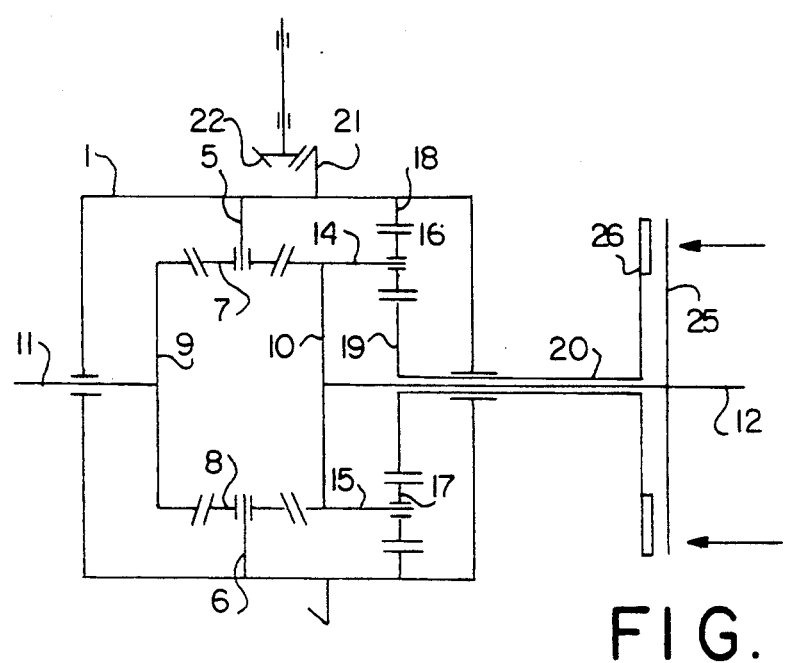
FIG. 4 shows in the same manner the same gear adapted for alternative passive control.

Alternative passive control of the gear is shown in FIG. 4. On the output shaft 12 is arranged a brake disk 25, and on the control shaft 20 a brake 26 cooperating with the brake disk, whereby the shafts 12 and 20 can be more or less firmly coupled to each other.

Figure 5:
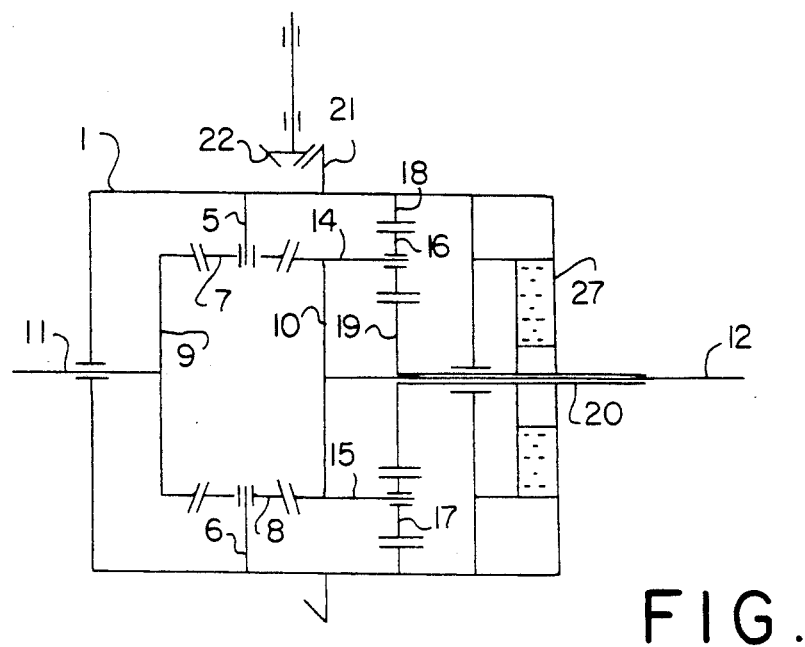
FIG. 5 shows in the same manner the same gear adapted for active control.

Active control of the gear is shown in FIG. 5. Between the gear housing 1 and the control shaft 20 is arranged a motor, in this case a hydraulic motor 27, which can impart to the hollow shaft 20 a rotational speed differing from that of the gear housing 1. If the gear is used in a motor vehicle, the driving wheels of which are mounted on the shaft 11 and 12, and driving takes place straight ahead, the control shaft 20 rotates at the same rotational speed as the differential gear housing 1 and the output shaft 12. When driving in a curve, the control shaft 20, by means of the motor 27, can be given a higher or lower rotational speed than the housing 1. Higher speed results in that the output shaft 12 rotates faster than the shaft 11, and vice versa. This condition can be used to positively give the drive wheels of a vehicle different rotational speeds depending on curve radiuses. Control of such a process can take place depending on, e.g., steering wheel position. Differential brake and/or lock function can be accomplished by means of a restriction valve between the inlet and outlet of the hydraulic motor.

It is understood that driving of the control shaft 20 may take place in many ways other than the one described, e.g., by means of gear-wheel or chain transmissions.

Figure 6:
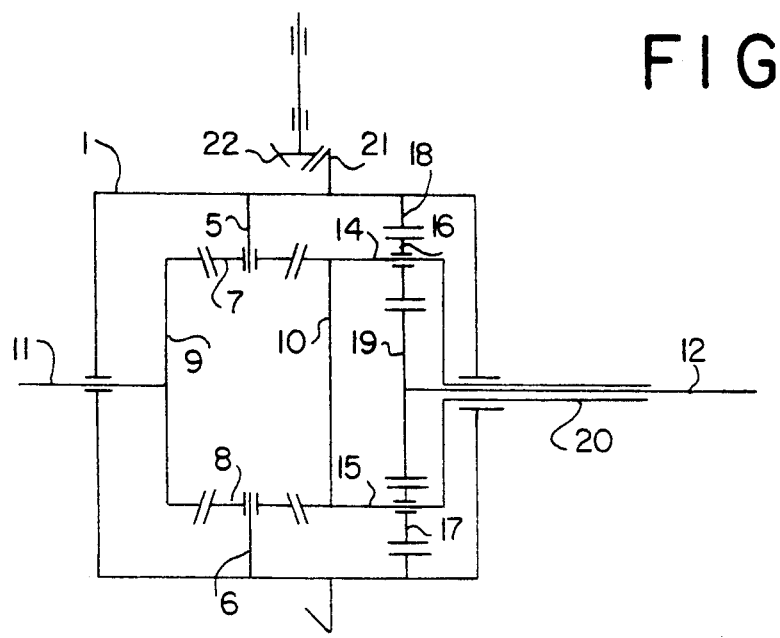
FIG. 6 shows schematically the gear according to the second embodiment.

FIG. 6 is schematically shows the second embodiment of the differential gear according to the invention, wherein the sun wheel 19 is connected to the output shaft 12 and the shaft of the side wheel 10 in the shape of a hollow shaft 20 is journalled around the shaft 12. Passive or active control, described above with reference to FIGS. 3, 4 and 5 can be utilized in this embodiment as well, a brake or a drive motor, respectively, then being arranged between the hollow shaft 20, acting as a control shaft, and the differential gear housing 1.

Those skilled in the art will understand that passive and active control, i.e. braking and driving, can be combined in both embodiments.

According to the invention, a differential gear can be provided with two planetary gears. An example of such a gear, in principle being constituted by doubling the gear of FIGS. 1 and 2, is shown in FIG. 7.

Figure 7:
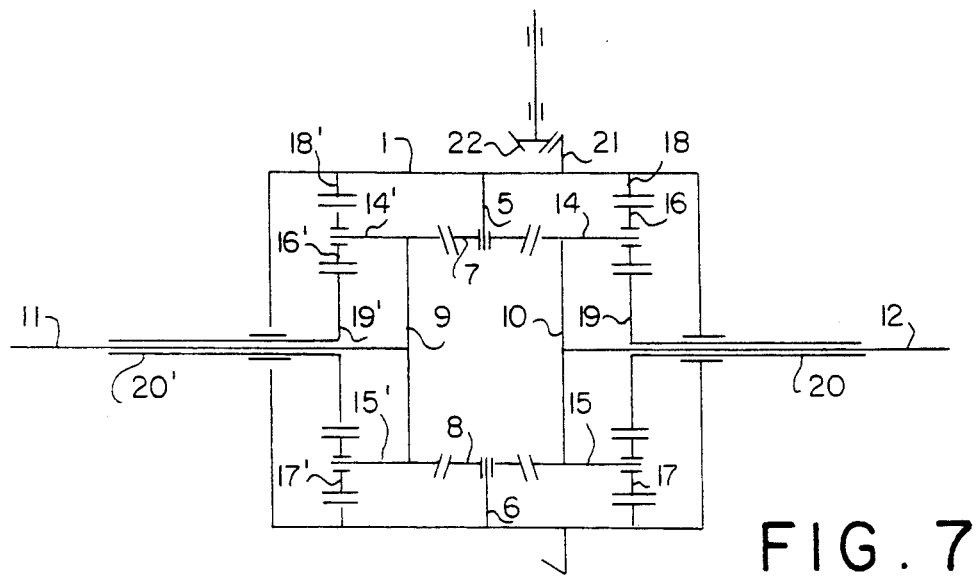
FIG. 7 shows schematically a differential gear having two planetary gears.

As the gear is shown in FIG. 7, its right part from the output shaft 12 to the differential gear planet wheels 7 and 8 corresponds to the gear of FIG. 2. In the gear according to FIG. 7, however, the side wheel 9 is adapted as a planet wheel holder for the planet wheels of a second planetary gear. These, as well as the further parts included in the second planetary gear, have the same reference numerals as corresponding parts in the first planetary gear, but augmented by a prime.

Control of the gear according to FIG. 7 can, as before, be passive or active. At passive control for obtaining differential brake or differential lock function one or both control shafts, i.e., the hollow shafts 20, 20', are braked against the differential gear housing 1 in the manner shown in FIG. 3.

Figure 8:
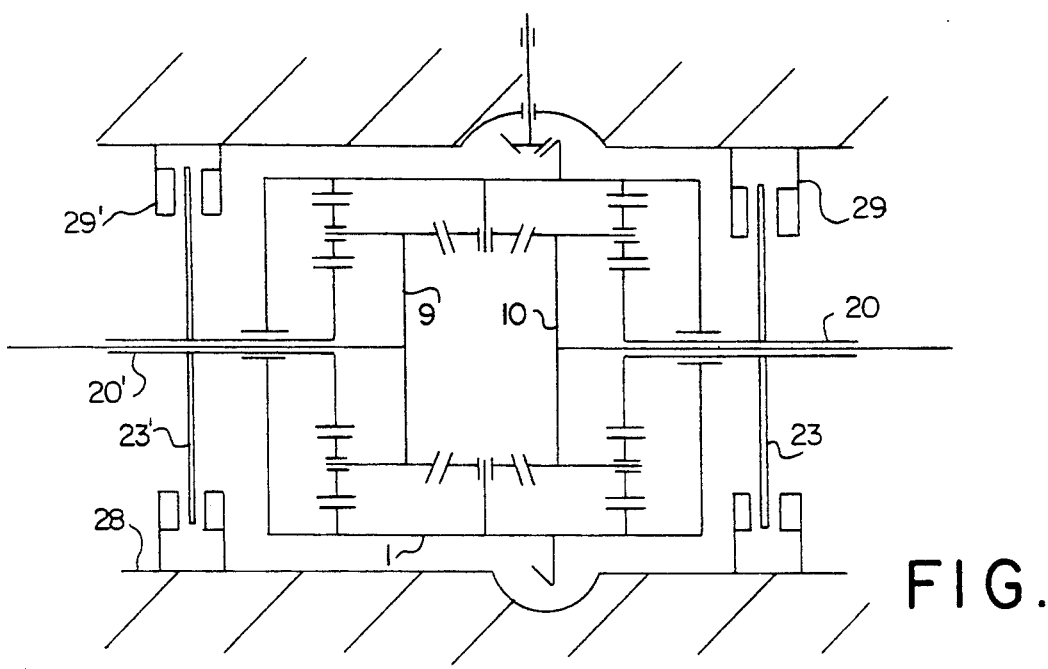
FIG. 8 shows schematically a passively controllable gear according to FIG. 7.

Braking also can take place against ground, e.g., against brakes 29, 29' connected to a vehicle chassis 28 according to FIG. 8. Equal braking of the hollow shafts 20, 20' involves a driving brake function, while unsymmetrical braking involves turning.

Figure 9:
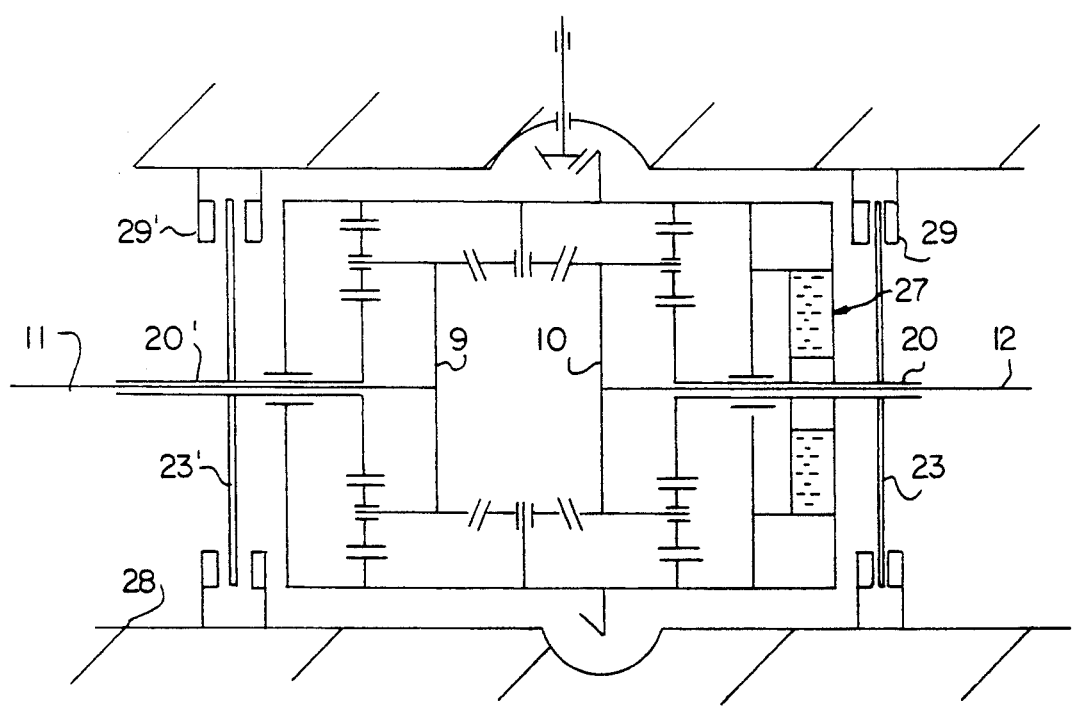
FIG. 9 shows an actively controllable gear according to FIG. 7.

In practice, active control of the gear of FIG. 7 takes place by driving only one of the control shafts 20, 20'. This form of control, which is mainly contemplated as a complement to passive control, particularly when small turning radiuses are concerned, e.g., in tracked vehicles, is shown in FIG. 9 and comprises, as appears, in principle a combination of the gears of FIGS. 5 and 8. Between the gear housing 1 and the hollow shaft 20, thus, inside the brake 23, 29 is arranged a hydraulic motor 27.

When actively controlling a gear according to the present invention, i. e., driving of a control shaft, rotation of a vehicle can be achieved around the center of the driving wheels or driving tracks when the drive transmission is inactive, i.e., when the differential gear housing is standing still.

Specific for a differential gear according to the invention is that active or passive control of a control shaft does not affect the algebraic sum of the rotational speeds of the two output shafts.

A practical way of providing active control, i.e., driving of the control shaft, is to arrange outside the differential gear a further planetary gear, the housing of which is driven by the differential gear housing and the planet wheel holder of which is driven by the control shaft, the gear ratios being so selected that the sun wheel of the further planetary gear stands still when the output shafts of the differential gear have the same rotational speed. This means that a control lever or wheel can be mounted on the normally still-standing sun wheel shaft of the further planetary gear for direct manual influence on the control of the differential gear.

As is appreciated by a person skilled in the art, a differential gear according to the invention can be realized in many ways. Further, several gears according to the invention can be combined in order to achieve special functions.

For instance, in a four wheel drive vehicle, a gear according to FIG. 5 can be arranged for each pair of driving wheels and a third such gear therebetween. The drive motor of the vehicle then drives the gear housing of the intermediate gear, and the output shafts of the intermediate gear drive one each of the gear housings of the driving wheel gears, while the output shafts of the latter gears carry the driving wheels. With this arrangement, it is possible to obtain separate control for each driving wheel, and, further, power distribution between the front and rear axles. With two motors connected to one each of the output shafts of a gear according to FIG. 5, said shafts then actually being input shafts, the gear housing can drive an output shaft common to the motors. With one motor driving the gear housing of a gear according to FIG. 5, propellers connected to the output shafts through angular drive gears can be separately controlled.

I claim:

1. A controllable differential gear comprising a differential gear and at least one planetary gear, said differential gear including:
   a differential gear housing (1) drivable for rotation;
   freely rotatable differential planet wheels (7, 8) mounted in said housing for rotation therewith; and
   differential side wheels (9, 10) mounted in said housing and meshing with said differential planet wheels (7, 8), said differential side wheels (9, 10) being freely rotatable relative to said differential gear housing (1) and being nonrotationally connected to respective shafts (11, 12), each of said shafts (11, 12) being rotatable relative to said differential gear housing (1);
   and said at least one planetary gear including:
   a ring wheel (18), planet wheels (16, 17) carried by planet wheel carriers (14, 15), and a sun wheel (19);
   wherein:
   (a) said differential gear housing (1) is rigidly connected to said ring wheel (18) for rotation therewith;
   (b) at least one of said differential side wheels (10) carries said planet wheel carriers (14, 15) and said planet wheels (16, 17) of said at least one planetary gear; and
   (c) said sun wheel (19) of said at least one planetary gear is rotatable relative to said shaft (12) connected to said at least one differential side wheel (10);
   (d) said shaft (12) is an output shaft of said controllable differential gear;
   (e) said controllable differential gear further including means (20) for imparting a rotational movement to said sun wheel (19) of said at least one planetary gear relative to said shaft (12).

2. A controllable differential gear according to claim 1 including means (20, 23, 26) for braking said sun wheel (19) relative to said differential gear housing (1).

3. A controllable differential gear according to claim 1, including means (20, 25, 26) for braking said sun wheel (19) relative to said shaft (12) connected to said at least one differential side wheel (10).

4. A controllable differential gear according to claim 1, including means (27) for positively driving said sun wheel (19) at a speed of revolution differing from that of said differential gear housing (1).

5. A controllable differential gear according to claim 2, further including means for positively driving said sun wheel (19) at a speed of revolution differing from that of said differential gear housing (1).

6. A controllable differential gear according to claim 1, wherein said sun wheel (19) is connected to a hollow shaft (20) arranged around said output shaft (12), said hollow shaft (20) constituting said means for imparting rotational movement to said sun wheel (19).

7. A controllable differential gear comprising a differential gear and at least one planetary gear, said differential gear including:
   a differential gear housing (1) driveable for rotation;
   freely rotatable differential planet wheels (7, 8) mounted in said housing for rotation therewith;
   differential side wheels (9, 10) mounted in said housing and meshing with said differential planet wheels (7, 8), said differential side wheels (9, 10) being freely rotatable relative to said differential gear housing (1) and being non-rotationally connected to respective shafts (11, 20), each of said shafts (11, 20) being rotatable relative to said differential gear housing (1);
   and said at least one planetary gear including:
   a ring wheel (18), planet wheels (16, 17) carried by planet wheel carriers (14, 15), and sun wheel (19);
   wherein:

(a) said differential gear housing (1) is rigidly connected to said ring wheel (18) for rotation therewith;

(b) at least one of said differential side wheels (10) carries said planet wheel carriers (14, 15) and said planet wheels (16, 17) of said at least one planetary gear;

(c) said sun wheel (19) of said at least one planetary gear is rotatable relative to said shaft (20) connected to said at least one differential side wheel (10), said sun wheel (19) of said at least one planetary gear further being non-rotationally connected to an output shaft (12) of said controllable differential gear; and (d) said controllable differential gear further including means (20) for imparting a rotational movement to said at least one differential side wheel (10) relative to said output shaft (12).

8. A controllable differential gear according to claim 7, including means for braking said at least one differential side wheel (10) relative to said differential gear housing (1).

9. A controllable differential gear according to claim 7, including means for braking said at least one differential side wheel (10) relative to said output shaft (12).

10. A controllable differential gear according to claim 7, including means for positively driving said at least one differential side wheel (10) at a speed of revolution differing from that of said differential gear housing (1).

11. A controllable differential gear according to claim 8, further including means for positively driving said at least one differential side wheel (10) at a speed of revolution differing from that of said differential gear housing (1).

12. A controllable differential gear according to claim 7, wherein said at least one differential side wheel (10) is connected to a hollow shaft (20) arranged around said output shaft (12), said hollow shaft (20) constituting said means for imparting rotational movement to said at least one differential side wheel. (10).

* * * * *

UNITED STATES PATENT AND TRADEMARK OFFICE
CERTIFICATE OF CORRECTION

PATENT NO. : 5,176,589
DATED : January 5, 1993
INVENTOR(S) : Borgudd

It is certified that error appears in the above-indentified patent and that said Letters Patent is hereby corrected as shown below:

On the title page, after item [22] insert the priority data as follows:

--[30]  Foreign Application Priority Data

May 29, 1986  [SE]  Sweden ..............8602450-2 --

Signed and Sealed this

First Day of February, 1994

Attest:

BRUCE LEHMAN

*Attesting Officer*      Commissioner of Patents and Trademarks